(12) United States Patent
Han et al.

(10) Patent No.: US 12,418,835 B2
(45) Date of Patent: Sep. 16, 2025

(54) METHOD OF DYNAMIC TRANSCEIVER CONFIGURATION

(71) Applicant: ZTE CORPORATION, Guangdong (CN)

(72) Inventors: Zhiqiang Han, Shenzhen (CN); Yonggang Fang, Shenzhen (CN); Bo Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 17/855,385

(22) Filed: Jun. 30, 2022

(65) Prior Publication Data

US 2022/0338063 A1 Oct. 20, 2022

Related U.S. Application Data

(63) Continuation of application No. PCT/CN2020/109282, filed on Aug. 14, 2020.

(51) Int. Cl.
*H04W 28/12* (2009.01)
*H04L 47/41* (2022.01)

(52) U.S. Cl.
CPC ............ *H04W 28/12* (2013.01); *H04L 47/41* (2013.01)

(58) Field of Classification Search
CPC . H04W 28/12; H04W 74/0808; H04W 72/04; H04W 72/046; H04L 47/41; H04L 5/0094; H04L 5/0023
See application file for complete search history.

(56) References Cited

U.S. PATENT DOCUMENTS

| | | | |
|---|---|---|---|
| 2010/0220678 A1 | 9/2010 | Wentink | |
| 2014/0119288 A1 | 5/2014 | Zhu et al. | |
| 2015/0173014 A1 | 6/2015 | Lee et al. | |
| 2018/0376486 A1 | 12/2018 | Ahn et al. | |
| 2021/0067285 A1* | 3/2021 | Cariou | H04L 5/0053 |
| 2021/0377928 A1* | 12/2021 | Seok | H04L 69/14 |
| 2022/0029736 A1* | 1/2022 | Chu | H04L 1/0023 |
| 2022/0287121 A1* | 9/2022 | Hwang | H04W 76/15 |
| 2023/0309151 A1* | 9/2023 | Kim | H04W 74/0866 |
| 2024/0224124 A1* | 7/2024 | Jang | H04B 1/00 |

FOREIGN PATENT DOCUMENTS

| | | |
|---|---|---|
| CN | 102318428 A | 1/2012 |
| CN | 104393904 A | 3/2015 |
| CN | 106954273 A | 7/2017 |
| CN | 107079486 A | 8/2017 |

(Continued)

OTHER PUBLICATIONS

Extended European Search Report for EP Appl. No. 20949156.2, dated Oct. 28, 2022 (7 pages).

(Continued)

*Primary Examiner* — Ricky Q Ngo
*Assistant Examiner* — David M Kayal
(74) *Attorney, Agent, or Firm* — Foley & Lardner LLP

(57) ABSTRACT

A wireless communication method for use in a first wireless device is disclosed. The wireless communication method comprises transmitting, to a second wireless device, a request frame on a first link in a transmission opportunity, wherein the request frame comprises the requested number of spatial streams for a data transmission on the first link in the transmission opportunity.

9 Claims, 6 Drawing Sheets

(56) References Cited

FOREIGN PATENT DOCUMENTS

| | | | | |
|---|---|---|---|---|
| CN | 107925520 A | 4/2018 | | |
| CN | 109479324 A | 3/2019 | | |
| EP | 4145938 A1 * | 3/2023 | ............. | H04L 5/001 |

OTHER PUBLICATIONS

International Search Report and Written Opinion for PCT Appl. No. PCT/CN2020/109282, dated Apr. 23, 2021 (8 pages).
First Office Action for CN Appl. No. 202080094271.1, dated Mar. 7, 2025 (with English translation, 15 pages).

* cited by examiner

Transmit, to a second wireless device, a request frame on a first link in a transmission opportunity, wherein the request frame comprises the requested number of spatial streams for a data transmission on the first link in the transmission opportunity — 900

FIG. 9

Receive, from a first wireless device, a request frame on a first link in a transmission opportunity, wherein the request frame comprises the requested number of spatial streams for a data transmission on the first link in the transmission opportunity — 1000

FIG. 10

METHOD OF DYNAMIC TRANSCEIVER CONFIGURATION

CROSS-REFERENCE TO RELATED APPLICATION

This application claims the benefit of priority under 35 U.S.C. § 120 as a continuation of PCT Patent Application No. PCT/CN2020/109282, filed on Aug. 14, 2020, the disclosure of which is incorporated herein by reference in its entirety.

TECHNICAL FIELD

This document is directed generally to wireless communications.

SUMMARY

Nowadays, wireless communications are widely used in society and people's everyday lives. As many new use services (such as factory automations, gaming, emergency communication, virtual reality (VR), augmented reality (AR), etc.) are developed, the wireless communications are required to have low latency and high throughput for such services.

A wireless local area network (WLAN) is a wireless computer network that links two or more devices using wireless communications to form a local area network (LAN) within a limited area, e.g. a home, school, campus or office building. Most modern WLANs are based on IEEE 802.11 standards.

In addition, a basic service set (BSS) is the basic building block of an IEEE 802.11 LAN. An infrastructure BSS includes the BSS with stations (STAs) which connect to the internet through associating with an Access Point (AP).

The basic medium access protocol is a DCF (Distributed Coordination Function) that allows for automatic medium sharing through the use of CSMA/CA (Carrier Sense Multiple Access with Collision Avoidance) and a random back-off time. EDCA (Enhanced Distributed Channel Access) provides different priority access for different QoS services. With EDCA, high priority traffic has a higher chance of being sent than low-priority traffic.

This document relates to methods, systems, and devices for dynamically configuring transceiver.

The present disclosure relates to a wireless communication method for use in a first wireless device. The wireless communication method comprises:

transmitting, to a second wireless device, a request frame on a first link in a transmission opportunity, wherein the request frame comprises the requested number of spatial streams for a data transmission on the first link in the transmission opportunity.

Various embodiments may preferably implement the following features:

Preferably, the requested number of spatial streams is greater than the original number of spatial streams supported by at least one of the first wireless device or the second wireless device on the first link.

Preferably, the request frame further comprises at least one of a bandwidth of the first link, the maximum transmission rate of the first link or a validity period of the requested number of spatial streams.

Preferably, the wireless communication method further comprises receiving, from the second wireless device, a response frame comprising the expected number of spatial streams for the data transmission on the first link in the transmission opportunity, wherein the expected number of spatial streams is smaller than or equal to the requested number of spatial streams.

Preferably, the wireless communication method further comprises switching at least one transmission resource of at least one second link to the first link based on the expected number of spatial streams, wherein the at least one transmission resource comprises at least one of a transceiver module, an antenna or a demodulation module Preferably, the wireless communication method further comprises switching the at least one transmission resource back to the at least one second link after a validity period of the requested number of spatial streams expires.

Preferably, the wireless communication method further comprises transmitting, to the second wireless device, at least one data frame of the data transmission on the first link in the transmission opportunity, wherein the number of spatial streams used for transmitting the at least one data frame is smaller than or equal to the expected number of spatial streams.

Preferably, the number of spatial streams used for transmitting a current data frame in the at least one data frame is smaller than or equal to the number of spatial streams used for transmitting a previous data frame which is before the current data frame and in the at least one data frame.

Preferably, the number of spatial streams used for transmitting a current data frame in the at least one data frame is smaller than the number of spatial streams used for transmitting a previous data frame which is before the current data frame and in the at least one data frame, and the wireless communication method further comprises switching at least one transmission resource of the first link to at least one second link based on at least one of the number of spatial streams used for transmitting the current data frame, the number of spatial streams used for transmitting the previous data frame or the original number of spatial streams supported by at least one of the first wireless device or the second wireless device on the first link.

Preferably, the wireless communication method further comprises determining a transmission failure of transmitting a current data frame of the at least one data frame, and switching at least one transmission resource of the first link back to at least one second link based on at least one of the number of spatial streams used for transmitting the current data frame in the at least one data frame, the number of spatial streams used for transmitting a previous data frame before the current data frame or the original number of spatial streams supported by at least one of the first wireless device or the second wireless device on the first link.

Preferably, the wireless communication method further comprises transmitting at least one remaining data frame in the at least one data frame after the transmission failure by using the original number of spatial streams supported by at least one of the first wireless device or the second wireless device on the first link.

The present disclosure further relates to a wireless communication method for use in a second wireless device. The wireless communication method comprises:

receiving, from a first wireless device, a request frame on a first link in a transmission opportunity, wherein the request frame comprises the requested number of spatial streams for a data transmission on the first link in the transmission opportunity.

Various embodiments may preferably implement the following features:

Preferably, the requested number of spatial streams is greater than the original number of spatial streams supported by at least one of the first wireless device or the second wireless device on the first link.

Preferably, the request frame further comprises at least one of a bandwidth of the first link, the maximum transmission rate of the first link or a validity period of the requested number of spatial streams.

Preferably, the wireless communication method further comprises transmitting, to the first wireless device, a response frame comprising the expected number of spatial streams for the data transmission on the first link in the transmission opportunity, wherein the expected number of spatial streams is smaller than or equal to the requested number of spatial streams.

Preferably, the wireless communication method further comprises switching at least one reception resource of at least one second link to the first link based on the expected number of spatial streams.

Preferably, the at least one reception resource comprises at least one of a transceiver module, an antenna or a demodulation module.

Preferably, the wireless communication method further comprises switching the at least one reception resource back to the at least one second link after a validity period of the requested number of spatial streams expires.

Preferably, the wireless communication method further comprises receiving, from the first wireless device, at least one data frame of the data transmission on the first link in the transmission opportunity, Preferably, the number of spatial streams used for receiving the at least one data frame is smaller than or equal to the expected number of spatial streams.

Preferably, the number of spatial streams used for receiving a current data frame in the at least one data frame is smaller than or equal to the number of spatial streams used for receiving a previous data frame which is before the current data frame and in the at least one data frame.

Preferably, the number of spatial streams used for receiving a current data frame in the at least one data frame is smaller than the number of spatial streams used for receiving a previous data frame which is before the current data frame and in the at least one data frame, and the wireless communication method further comprises switching at least one reception resource of the first link to at least one second link based on at least one of the number of spatial streams used for receiving the current data frame, the number of spatial streams used for receiving the previous data frame or the original number of spatial streams supported by at least one of the first wireless device or the second wireless device on the first link.

Preferably, the wireless communication method further comprises determining a reception failure of receiving a current data frame of the at least one data frame, and switching at least one reception resource of the first link back to at least one second link based on at least one of the number of spatial streams used for receiving the current data frame in the at least one data frame, the number of spatial streams used for receiving a previous data frame before the current data frame or the original number of spatial streams supported by at least one of the first wireless device or the second wireless device on the first link.

Preferably, the wireless communication method further comprises receiving at least one remaining data frame in the at least one data frame after the reception failure by using the original number of spatial streams supported by at least one of the first wireless device or the second wireless device on the first link.

Preferably, the at least one reception resource of the first link is switched back to at least one second link a specific period after determining the reception failure.

The present disclosure relates to a first wireless device. The first wireless device comprises a communication unit, configured to transmit, to a second wireless device, a request frame on a first link in a transmission opportunity, wherein the request frame comprises the requested number of spatial streams for a data transmission on the first link in the transmission.

Various embodiments may preferably implement the following feature:

Preferably, the first wireless device further comprises a processor configured to perform any of the aforementioned wireless communication method.

The present disclosure relates to a second wireless device. The second wireless device comprises a communication unit, configured to receive, from a first wireless device, a request frame on a first link in a transmission opportunity, wherein the request frame comprises the requested number of spatial streams for a data transmission on the first link in the transmission.

Various embodiments may preferably implement the following feature:

Preferably, the second wireless device further comprises a processor configured to perform any of the aforementioned wireless communication method.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 9 shows a flowchart of a process according to an embodiment of the present disclosure.

FIG. 10 shows a flowchart of a process according to an embodiment of the present disclosure.

DETAILED DESCRIPTION

According to an embodiment of the present disclosure, a multi-link device (MLD) with multiple affiliated stations (STA) may be adopted to support high throughput and low latency. Note that each STA in the MLD works on one link.

Figure 1:
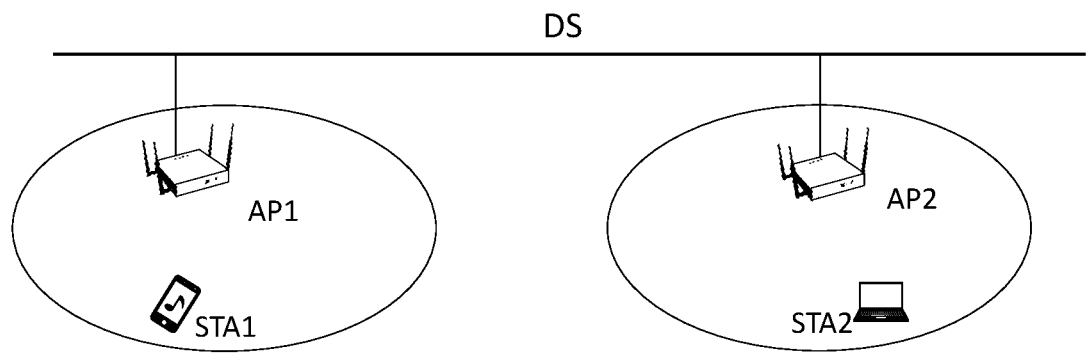
FIG. 1 shows an example of infrastructure basic service set according to an embodiment of the present disclosure.

FIG. 1 illustrates an example of infrastructure BSS according to an embodiment of the present disclosure. In FIG. 1, each infrastructure BSS may include one access point (e.g. AP1 or AP2) and multiple stations (e.g. STA1 or STA2). In this embodiment, an access point is any entity that has STA functionality and a distribution system access function (DSAF), which enables the access to the DS (distribution system), via the wireless medium for associated STAs. The DS enables the wireless bridging of access points (e.g. AP1 and AP2) in the network.

Figure 2:
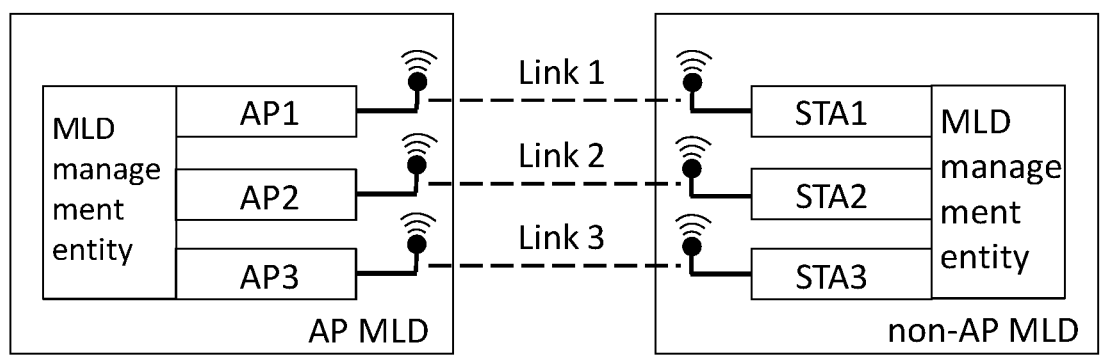
FIG. 2 shows an example of access point multi-links device and non-access-point multi-links device according to an embodiment of the present disclosure.

FIG. 2 illustrates an example of AP MLD (Multi-link device) and non-AP MLD according to an embodiment of the present disclosure. In an embodiment, the AP MLD has more than one affiliated AP (i.e. AP1, AP2, and AP3) and each AP works on one link. Similarly, the non-AP MLD that has more than one affiliated STA (i.e. STA1, STA2 and STA3) and each STA works on one link.

In an embodiment, due to limitations of device's cost, size and other factors, it is difficult for each link to have an independent and powerful transceiver module. For example, it is difficult for each link to be equipped with multiple antennas and a powerful demodulation or encoding module in the device.

In an embodiment, due to the real-time change of wireless environment, the transmitting station uses CSMA/CA to obtain the channel usage permission for the IEEE802.11 technology working in the unlicensed frequency band. Therefore, multiple stations may be able to share the media in the unlicensed band. Since the receiving station cannot know exactly when the transmitting station will send, it has to be in the listening mode for monitoring the operation channel to receive the transmitted data packet.

Figure 3:
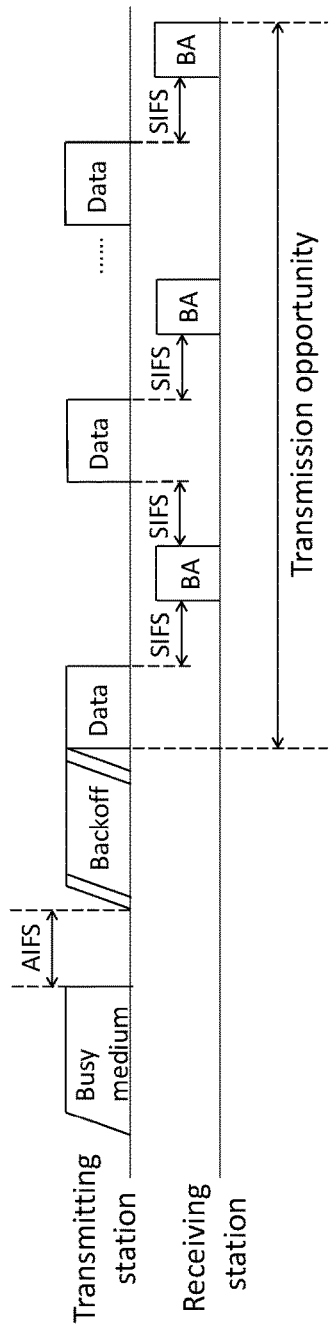
FIG. 3 shows a schematic diagram of frame exchange according to an embodiment of the present disclosure.

FIG. 3 illustrates a schematic diagram of a frame exchange according to an embodiment of the present disclosure. More specifically, before transmitting data from a transmitting station (AP MLD) to a receiving station (e.g. non-AP MLD), the transmitting station may need to perform a backoff procedure for a subsequent transmission opportunity (TXOP). If the transmitting station successfully obtains the TXOP, the transmitting station transmits data frames in the TXOP and the receiving station accordingly sends an acknowledge (ACK) or block ACK (BA) frame. Note that AIFS (Arbitration Interframe space) and SIFS (short Interframe Space) are system defined spaces.

In an embodiment of multiple links (e.g. FIG. 2), the receiving station may be unable to switch the receiving capabilities (e.g. reception resources, transceiver module(s), antenna(s) and/or demodulation module(s)) of link-2 (such as antennas, decoders, etc.) to link-1 to enhance link-1's existing reception capability due to various reasons. For example, when the receiving station is in the receiving state or when the receiving station is transmitting wireless frame(s) on link-2, the receiving station cannot switch the receiving capabilities of the link-2 to link-1. Thus, in an embodiment of the transmitting station does not have dynamic negotiation with the receiver, the transmitting station may directly transmit wireless frame(s) to the receiving station in spatial streams more than the receiving station's original receiving capability on a link-1. Under such conditions, the receiving station could not receive the transmitted spatial streams correctly. If the receiving station switches the receiving capability of link-2 to link-1 and the transmitting station only sends wireless frames based on the capability of the receiving station's link-1, the switched resources allocated by the receiving station are wasted.

In an embodiment, the transmitting station's capability in certain links may not be enough for achieving greater throughput or reducing delay. When the transmitting station wants to transmit data in a link with more than the transmission capability of the transmitting station in a link, the transmitting station may need to switch the transmission capability of other links to this link, to constitute a more powerful capability. In such conditions, the link with more powerful capability is able to transmit data with, e.g., a larger number of streams, and/or a greater bandwidth, and/or a higher data rate, so as to improve the throughput and to reduce delay.

Figure 4:
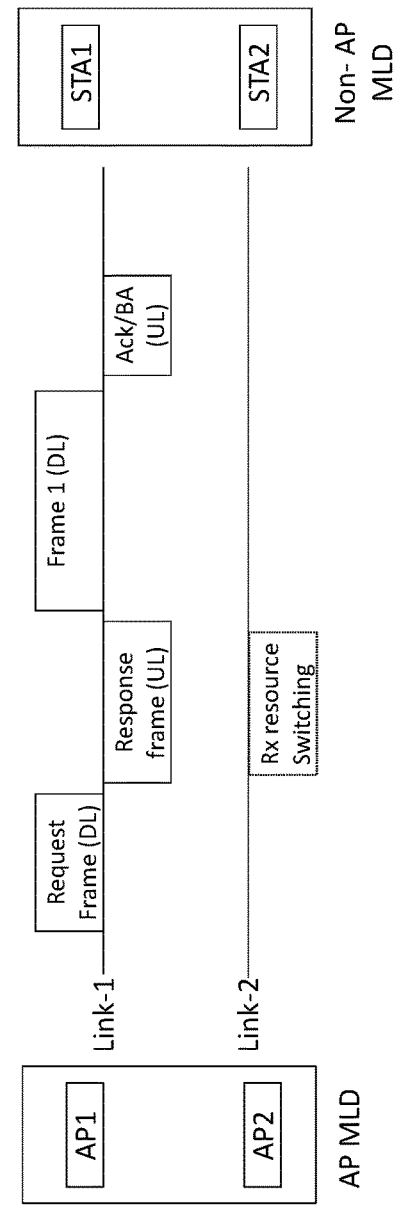
FIG. 4 shows an example of a multi-link operation establishment procedure using dynamic transceiver configuration according to an embodiment of the present disclosure.

FIG. 4 illustrates an example of the multi-link operation establishment procedure using dynamic transceiver configuration according to an embodiment of the present disclosure. A non-AP MLD is associated with an AP MLD. After the backoff procedure, the AP MLD transmits a request frame to the non-AP MLD in a TXOP. According to an embodiment, the requested number of spatial streams for the coming data transmission is included in the request frame. In an embodiment, the requested number of spatial streams indicates that the number of spatial streams that is intended to be used to transmit the data frame(s) or management frame(s) after a specific interframe space after the AP MLD receives the response frame from the non-AP MLD.

In the present disclosure, a downlink (DL) frame means that this frame is transmitted from the AP MLD to the non-AP MLD and an uplink (UL) frame represents the frame transmitted from the non-AP MLD to the AP MLD. For example, in FIG. 4, the request frame and Frame 1 are DL frames (e.g. transmitted from AP1 to STA1) and the response frame and the ACK/BA frame are UL frames (e.g. transmitted from STA1 to AP1).

In an embodiment, the requested number of spatial streams is larger than the original capability (e.g. the original number of spatial streams) of non-AP MLD on the link-1 where the request frame is received by the non-AP MLD.

In an embodiment, the AP MLD may also include other parameters in the request frame, such as a bandwidth, the maximum transmission rate, a transmission validity period, . . . , etc.

In an embodiment, the bandwidth indicates the maximum bandwidth that is intended to be used to transmit the data or management frame(s) after a specific interframe space after receiving the response frame.

In an embodiment, the max transmission rate indicates the max transmission rate that is intended to be used to transmit the data or management frame(s) after a specific interframe space after receiving the response frame.

In an embodiment, the transmission validity period indicates a duration in which the parameter(s) indicated in the request frame (e.g. the requested number of spatial streams) is valid.

In FIG. 4, after the non-AP MLD receives the request frame, the non-AP MLD transmits a response frame after a specific interframe space. In an embodiment, the expected number of spatial streams is indicated and/or included in the response frame.

In an embodiment, the expected number of spatial streams indicated by the response frame is not greater than (i.e. smaller than or equal to) the requested number of spatial streams indicated by the request frame.

In an embodiment, based on the expected number of spatial streams, the non-AP MLD switches reception (Rx) resource(s) (e.g. the antenna, demodulation module, Rx chain or other capability module) of other links (e.g. link-2) to the link where the request frame is received (e.g. link-1). In an embodiment, the switching procedure completes before the reception of data frames or management frames begins.

In an embodiment, the AP MLD transmits data frame(s) and/or management frame(s) after a specific interframe space after receiving the response frame. According to an embodiment, when the AP MLD sends the data frame(s) and/or management frame(s), the number of spatial streams is not greater than (i.e. smaller than or equal to) the expected number of spatial streams indicated in the response frame sent by the non-AP MLD.

In an embodiment, the number of spatial streams used by AP MLD in the subsequent transmission of a current data frame or management frame in this TXOP is not greater than the number of spatial streams of a previous data frame or management frame before the current data frame. Note that, the previous data frame and the current data frame are in the same TXOP.

In an embodiment, the non-AP MLD dynamically switches the reception (Rx) resource(s) (e.g. Rx chain) belonging to other link(s) back to other link(s) based on the number of spatial streams used in the data frame or management frame on the link-1 and/or the original capability of the non-AP MLD on the link-1. For example, the expected number of spatial streams is 5 for the link-1, the number of spatial streams used for transmitting/receiving a current data frame is 4 and the original capability (e.g. the original number of spatial streams) supported by the non-AP MLD on the link-1 is 3. In such conditions, the non-AP MLD may switch 1 (=5−4) transceiver and/or other related reception resource back to other link (e.g. link-2).

In an embodiment, the AP MLD may indicate the transmission validity period. After the validity period (expires), the number of spatial streams used by the AP MLD is not greater than the number of spatial streams originally belonging to the link-1.

In an embodiment, the AP MLD may indicate the transmission validity period. In this embodiment, after the validity period (expires), the non-AP MLD switches the reception resources belonging to other link(s) back to other link(s).

In an embodiment, the transmission validity period may be indicated by the duration field in MAC (media access control) header or another field other than the duration field.

In an embodiment, bandwidth may be indicated in the request frame and/or the response frame. According to an embodiment, when the AP MLD indicates the bandwidth in the request frame, the non-AP MLD may also indicate the bandwidth in the response frame. Note that, the bandwidth indicated in the response frame is not larger than the bandwidth in the request frame, if present. In an embodiment, the bandwidth used by the AP MLD for transmitting the data frame(s) or management frame(s) in TXOP does not exceed the bandwidth indicated in the response frame.

In an embodiment, the maximum transmission rate may be indicated in request frame and/or the response frame. Based on an embodiment, the maximum transmission rate may be a rate value or indicated by a coding rate and a modulation type. In an embodiment, the maximum transmission rate indicated in the response frame is not larger than the bandwidth in the request frame, if present. In addition, the maximum transmission rate used by the AP MLD to transmit the data frame(s) or management frame(s) in TXOP does not exceed the maximum transmission rate indicated in the response frame.

Figure 5:
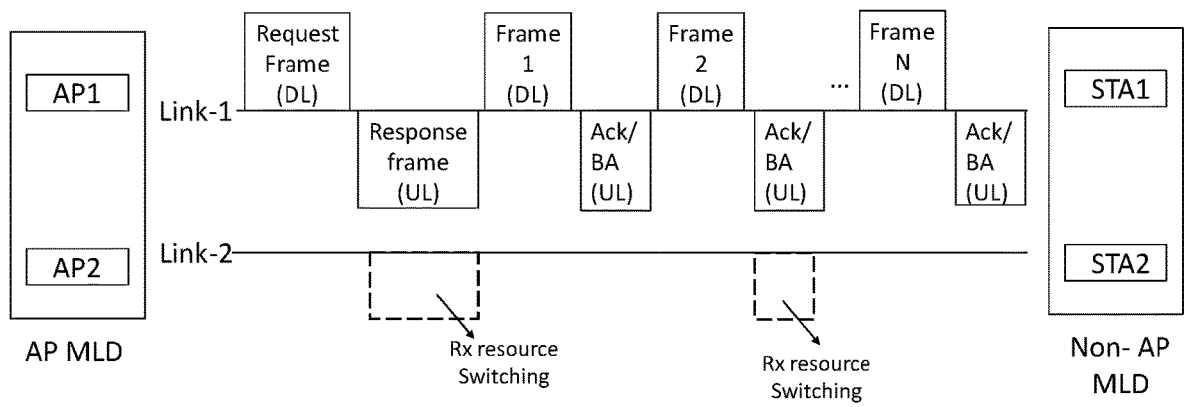
FIG. 5 shows an example of a procedure using dynamic transceiver configuration according to an embodiment of the present disclosure.

FIG. 5 shows an example of a procedure using dynamic transceiver configuration according to an embodiment of the present disclosure. In FIG. 5, the non-AP MLD is associated with the AP-MLD. Two stations (STA1 and STA2) are affiliated with the non-AP MLD, wherein STA1 works on link-1 and supports one spatial stream and STA2 works on link-2 and supports one spatial stream. In addition, two access points (AP1 and AP2) are affiliated with the AP MLD, wherein AP1 works on link-1 and supports two spatial streams and AP2 works on link-2 and supports two spatial streams.

After the backoff procedure, AP1 transmits a request frame to STA1 on link-1. In an embodiment, the request frame may be an enhanced RTS/MU-RTS (Request To Send/Multi-User Request To Send) or other control frame. In this embodiment, the requested number of spatial streams is set to 2 in the request frame.

Next, STA1 transmits the response frame to AP1 on link-1. The interframe space between the request frame and response frame is SIFS. In this embodiment, the expected number of spatial streams is set to 2 in the response frame.

In such a case, the non-AP MLD switches the reception capabilities of link-2 (such as antenna, demodulation or decoding module) to link-1 in order to receive the data frame(s) or management frame(s) which may be transmitted by using 2 spatial streams. In an embodiment, the switching procedure is completed before AP1 transmits data frame(s) or management frame(s).

The AP1 transmits a data frame or management frame (i.e. Frame 1) after receiving the response frame from STA1. In this embodiment, Frame 1 is transmitted by using 2 spatial streams. The interframe space between the response frame and Frame 1 is SIFS. The STA1 transmits the acknowledge frame to AP1 after receiving Frame 1.

The AP1 continues transmitting a data frame or management frame (i.e. Frame 2) to STA1 after receiving the acknowledge frame. In this embodiment, the AP1 may use different numbers of spatial streams to transmit Frame 2. Because the number of spatial streams used in Frame 2 is not greater than the number of spatial streams used in the previous data frame or management frame (Frame 1), the number of spatial streams to transmit Frame 2 can only change from 2 to 1.

When STA1 receives Frame 2 and determines the number of spatial streams is one, the STA1 may switch one spatial stream capability belonging to link-2 back to link-2.

The AP1 continues transmitting a data frame or management frame (e.g. Frame N) to STA1 after determining previous transmission(s) is/are successful. The number of spatial streams used in Frame N is not greater than the number of spatial streams used in the previous data frame or management frame (i.e. Frame N–1).

In FIG. 5, because the number of spatial streams used in Frame 2 is one, the number of spatial streams used for transmitting the pending data or management frame in the TXOP is one after Frame 2.

In an embodiment, AP1 may determine whether the transmission fails after the transmission of the request frame and AP1 may restart the backoff procedure.

Figure 6:
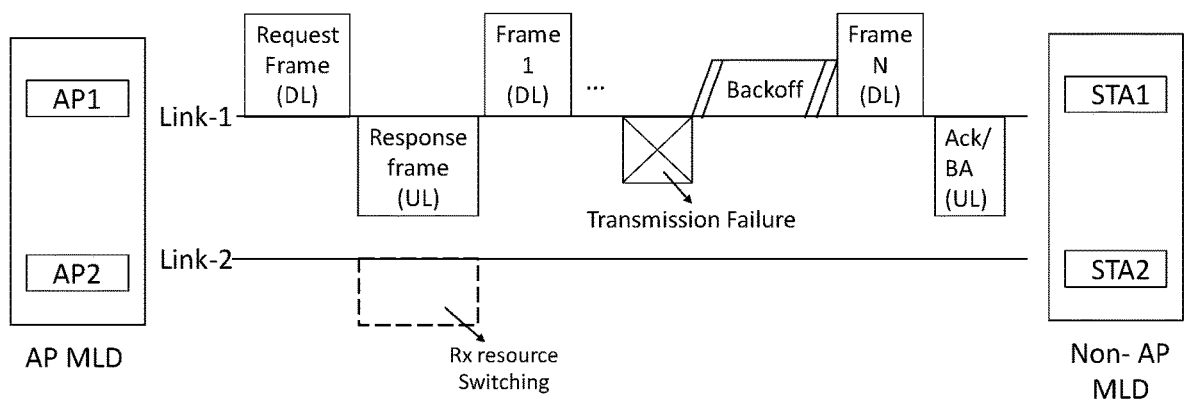
FIG. 6 shows an example of the procedure for a failure transmission according to an embodiment of the present disclosure.

FIG. 6 shows an example of the procedure for the failure transmission at AP MLD according to an embodiment of the present disclosure. In FIG. 6, the AP1 may determine a transmission failure after the transmission of Frame M (M is between 1 and N). That is, the transmission of Frame M fails. In such cases, the AP1 cannot continue transmitting a data frame or management frame by using the number of spatial streams which is larger than that originally supported by STA1 on link-1 until a new negotiation procedure (e.g. a new request frame and response frame exchange) for the transceiver configuration is completed.

In an embodiment, after determining the transmission failure, the AP MLD switches at least one Tx resource back to the link-2 based on at least one of the number of spatial streams of transmitting Frame M, the number of spatial streams of transmitting a previous data frame (e.g. Frame M–1) before Frame M, or the number of spatial streams originally supported by STA1 on link-1. In an embodiment, the AP MLD may transmit the remaining data frames in the TXOP (i.e. Frame M+1 to N) by using the number of spatial streams originally supported by STA1 on link-1.

Figure 7:
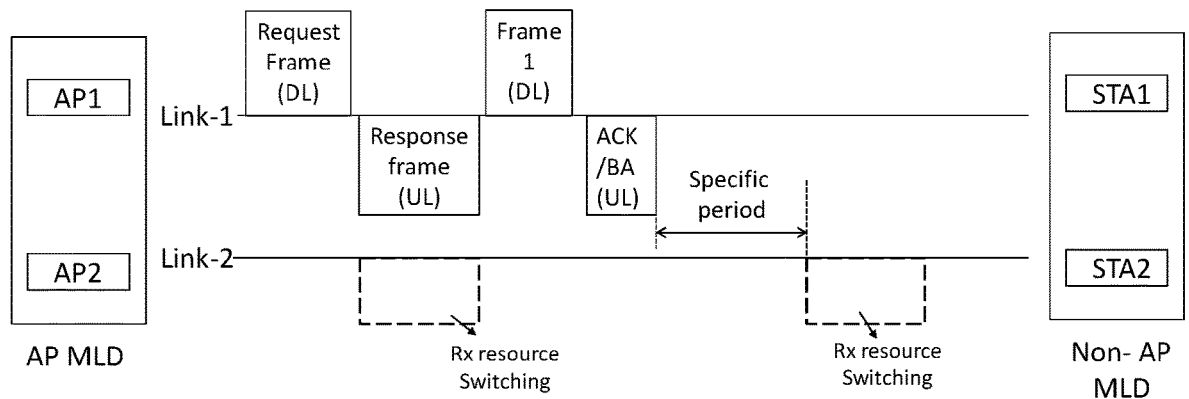
FIG. 7 shows an example of the procedure for a failure transmission according to an embodiment of the present disclosure.

FIG. 7 shows an example of the procedure for the failure transmission at non-AP MLD according to an embodiment of the present disclosure. In FIG. 7, STA1 receives a request frame, transmits a corresponding response frame, receives one data frame (e.g. frame 1) and transmits corresponding ACK/BA frame to AP1 in a TXOP. The detailed operations of STA1 receiving the request frame, transmitting the response frame, receiving the data frame and transmitting corresponding ACK/BA frame can refer to aforementioned embodiments and are not narrowed herein for brevity. In this embodiment, the ACK/BA may not be received by the AP1 or the STA1 does not receive a subsequent frame which is expected to be transmitted after the ACK/BA. In such conditions, the non-AP MLD may determine a reception failure and switch the reception capabilities originally belonging to link-2 back to link-2 after a specific period. For example, when the STA1 receive a TX end primitive (e.g. a PHY-TXEND.indication primitive) corresponding to the transmission of ACK/BA in the TXOP and does not receive a RX start primitive (e.g. PHY-RXSTART.indication primitive) during the specific period after the ACK/BA (e.g. the last frame sent to AP1), the STA1 (e.g. non-AP MLD) may switch the reception capabilities originally belonging to link-2 back to link-2.

Figure 8:
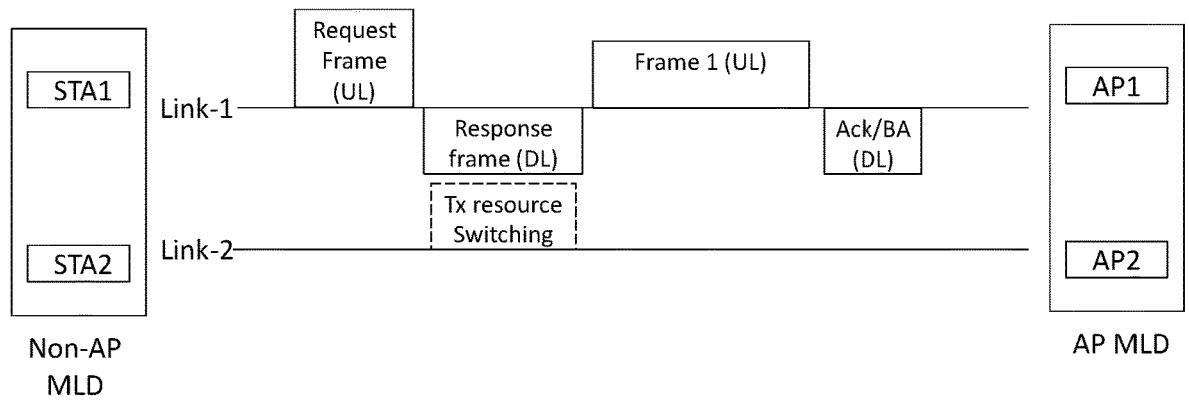
FIG. 8 shows an example of a transmission chain switching procedure according to an embodiment of the present disclosure.

FIG. 8 shows an example of a Tx chain switching procedure according to an embodiment of the present disclosure. In FIG. 8, the non-AP MLD is associated with the AP-MLD. In addition, two stations (STA1 and STA2) are affiliated with the non-AP MLD, wherein STA1 works on link-1 and supports one spatial stream and STA2 works on link-2 and supports one spatial stream. Similarly, two access points (AP1 and AP2) are affiliated with the AP MLD, wherein AP1 works on link-1 and supports two spatial streams. AP2 works on link-2 and supports two spatial streams.

In FIG. 8, the STA1 wants to transmit data frame(s) using two spatial streams. In such a case, the STA1 transmits a request frame to AP1 on link-1. In an embodiment, the request frame may be an enhanced RTS/MU-RTS or other control frame. In an embodiment, the requested number of spatial streams is set to 2 in the request frame.

Next, the AP1 determines that it can receive the data frame using 2 spatial streams and transmits the response frame to STA1 on link-1. The interframe space between the request frame and response frame is SIFS. In this embodiment, the expected number of spatial streams is set to 2 in the response frame.

Based on the negotiation results, the STA1 switches the tx chains of link-2 to link-1 to form a greater Tx capability on link-1 than the original capability supported by STA1 on link-1. Therefore, the STA1 is able to use 2 spatial streams to transmit the data frame (e.g. Frame 1).

On the other hands, the AP-MLD finds out that the non-AP MLD cannot receive frames on link-2, so AP2 cannot transmit any frame to STA2 on link-2.

FIG. 9 shows a flowchart of a process according to an embodiment of the present disclosure. The process shown in FIG. 9 may be used in a first wireless device (e.g. AP MLD or Non-AP MLD) and comprises the following step:

Step 900: Transmitting, to a second wireless device, a request frame on a first link in a transmission opportunity, wherein the request frame comprises the requested number of spatial streams for a data transmission on the first link in the transmission opportunity.

More specifically, after the first wireless device obtains a TXOP (e.g. via backoff procedure), the first wireless device may transmit a request frame on a first link (e.g. link-1 shown in FIG. 8) to a second wireless device (e.g. Non-AP MLD or AP MLD). In this embodiment, the request frame comprises the requested number of spatial streams for a data transmission on the first link in the TXOP.

In an embodiment, the requested number of spatial streams is greater than the original number of spatial streams supported by at least one of the first wireless device or the second wireless device on the first link. For example, the requested number of spatial streams may be 2 and the original number of spatial streams supported by the first wireless device and/or the second wireless device on the first link may be 1.

In an embodiment, the request frame further comprises at least one of a bandwidth of the first link, the maximum transmission rate of the first link or a validity period of the requested number of spatial streams.

In an embodiment, the first wireless device receives a response frame (e.g. in response to the request frame) from the second wireless device. In this embodiment, the response frame comprises the expected number of spatial streams for the data transmission on the first link in the TXOP. Note that the expected number of spatial streams is smaller than or equal to the requested number of spatial streams. For example, the requested number of spatial streams may be 2 and the expected number of spatial streams may be 2 or 1.

In an embodiment, based on the expected number of spatial streams, the first wireless device switches at least one transmission resource of at least one second link (e.g. link-2 shown in FIG. 8 and/or other links of the first wireless device) to the first link. For example, the at least one transmission resource comprises at least one of a transceiver module, an antenna or a demodulation module. In the present disclosure, the at least one transmission resource comprising at least one of a transceiver module, an antenna or a demodulation module may be equal to the at least one transmission resource comprises at least one at least one transceiver module and/or at least one antenna and/or at least one demodulation module. In an embodiment of the expected number of spatial streams being 2 and the original number of the spatial streams supported by the first wireless device on the first link being 1, the first wireless device may switch one transmission resource from the at least one second link to the first link in the TXOP, so as to be able to use 2 spatial streams to perform the data transmission.

In an embodiment, the first wireless device switches the at least one transmission resource back to the at least one second link after a validity period (which may be indicated in the request frame) of the requested number of spatial streams expires.

In an embodiment, the first wireless device transmits at least one data frame of the data transmission on the first link in the TXOP to the second wireless device. In this embodiment, the number of spatial streams used for transmitting the at least one data frame is smaller than or equal to the expected number of spatial streams.

In an embodiment, the number of spatial streams used for transmitting a current data frame in the at least one data frame is smaller than or equal to the number of spatial streams used for transmitting a previous data frame which is before the current data frame and in the at least one data frame.

In an embodiment, the number of spatial streams used for transmitting a current data frame in the at least one data frame may be smaller than the number of spatial streams used for transmitting a previous data frame which is before the current data frame and in the at least one data frame. In such a case, the first wireless device switching at least one transmission resource of the first link to at least one second link based on at least one of the number of spatial streams used for transmitting the current data frame, the number of spatial streams used for transmitting the previous data frame or the original number of spatial streams supported by the first wireless device and/or the second wireless device on the first link.

In an embodiment, when the first wireless device determines (e.g. finds out) a transmission failure of transmitting a current data frame of the at least one data frame, the first wireless device switches at least one transmission resource of the first link back to at least one second link based on at least one of the number of spatial streams used for transmitting the current data frame in the at least one data frame, the number of spatial streams used for transmitting a previous data frame before the current data frame or the original number of spatial streams supported by at least one of the first wireless device or the second wireless device on the first link. As an alternative or in addition, after determining the transmission failure, the first wireless device may transmit at least one remaining data frame in the at least one data frame by using the original number of spatial streams supported by at least one of the first wireless device or the second wireless device on the first link. According to an embodiment, the original number of spatial streams supported by one wireless device on the first link represents the number of spatial streams originally allocated by this wireless device to the first link, e.g., outside this TXOP.

FIG. 10 shows a flowchart of a process according to an embodiment of the present disclosure. The process shown in FIG. 10 may be used in a second wireless device (e.g. Non-AP MLD or AP MLD) and comprises the following step:

Step 1000: Receive, from a first wireless device, a request frame on a first link in a transmission opportunity, wherein the request frame comprises the requested number of spatial streams for a data transmission on the first link in the transmission opportunity.

Specifically, the second wireless device may receive a request frame on a first link in a transmission opportunity from a first wireless device (e.g. AP MLD or Non-AP MLD). In this embodiment, the request frame comprises the requested number of spatial streams for a data transmission on the first link in the transmission opportunity.

In an embodiment, the requested number of spatial streams is greater than the original number of spatial streams supported by the first wireless device and/or the second wireless device on the first link.

In an embodiment, the request frame further comprises at least one of a bandwidth of the first link, the maximum transmission rate of the first link or a validity period of the requested number of spatial streams.

In an embodiment, the second wireless device transmits a response frame to the first wireless device, e.g., in response to the request frame. In this embodiment, the response frame comprises the expected number of spatial streams for the data transmission on the first link in the transmission opportunity. Note that the expected number of spatial streams is smaller than or equal to the requested number of spatial streams.

Based on the expected number of spatial streams, the second wireless device may switch at least one reception resource of at least one second link to the first link. In the present disclosure, the reception resource may comprise at least one of a transceiver module, an antenna or a demodulation module. Note that the reception resource comprising at least one of a transceiver module, an antenna or a demodulation module may represent that the reception resource comprises at least one transceiver module, at least one antenna or at least one demodulation module.

In an embodiment, the second wireless device may switch the at least one reception resource back to the at least one second link after a validity period of the requested number of spatial streams expires.

In an embodiment, the second wireless device receives at least one data frame of the data transmission on the first link in the transmission opportunity from the first wireless device. In this embodiment, the number of spatial streams used for receiving the at least one data frame is smaller than or equal to the expected number of spatial streams.

In an embodiment, the number of spatial streams used for receiving a current data frame in the at least one data frame is smaller than or equal to the number of spatial streams used for receiving a previous data frame which is before the current data frame and in the at least one data frame.

In an embodiment, when the number of spatial streams used for receiving a current data frame in the at least one data frame is smaller than the number of spatial streams used for receiving a previous data frame which is before the current data frame and in the at least one data frame, the second wireless device may switch at least one reception resource of the first link to at least one second link based on at least one of the number of spatial streams used for receiving the current data frame, the number of spatial streams used for receiving the previous data frame or the original number of spatial streams supported by at least one of the first wireless device or the second wireless device on the first link.

In an embodiment, the second wireless device may determine a reception failure of receiving a current data frame of the at least one data frame. After determining the reception failure, the second wireless device switches at least one reception resource of the first link back to at least one second link based on at least one of the number of spatial streams used for receiving the current data frame in the at least one data frame, the number of spatial streams used for receiving a previous data frame before the current data frame or the original number of spatial streams supported by at least one of the first wireless device or the second wireless device on the first link. As an alternative or in addition, after determining the reception failure, the second wireless device receives at least one remaining data frame in the at least one data frame by using the original number of spatial streams supported by at least one of the first wireless device or the second wireless device on the first link. As an alternative or in addition, the second wireless device may switch the at least one reception resource of the first link back to the at least one second link after a specific period.

Figure 11:
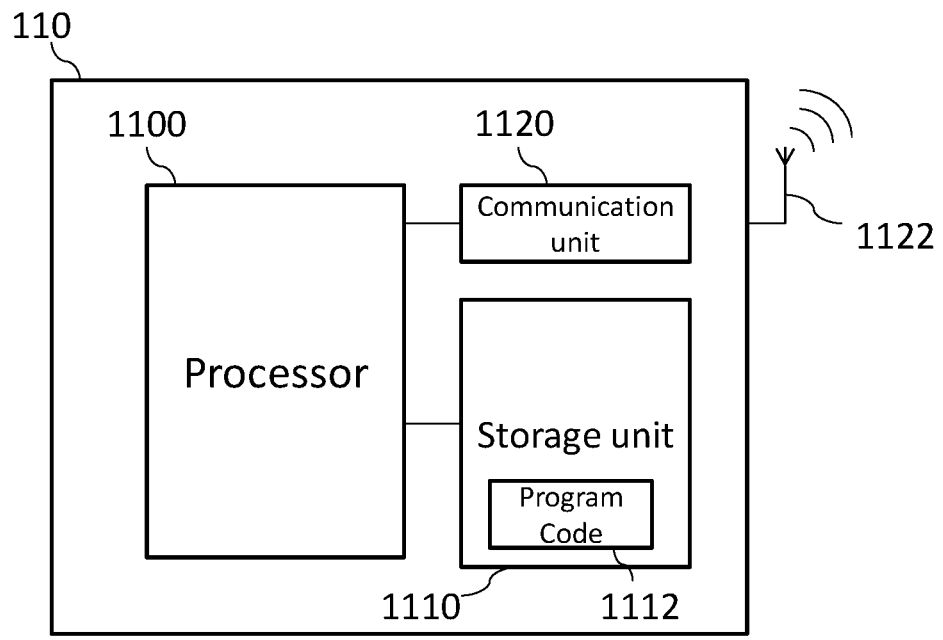
FIG. 11 shows an example of a schematic diagram of a wireless terminal according to an embodiment of the present disclosure.

FIG. 11 relates to a schematic diagram of a wireless terminal 110 according to an embodiment of the present disclosure. The wireless terminal 110 may be a user equipment (UE), a mobile phone, a laptop, a tablet computer, an electronic book or a portable computer system and is not limited herein. The wireless terminal 110 may include a processor 1100 such as a microprocessor or Application Specific Integrated Circuit (ASIC), a storage unit 1110 and a communication unit 1120. The storage unit 1110 may be any data storage device that stores a program code 1112, which is accessed and executed by the processor 1100. Embodiments of the storage unit 1110 include but are not limited to a subscriber identity module (SIM), read-only memory (ROM), flash memory, random-access memory (RAM), hard-disk, and optical data storage device. The communication unit 1120 may a transceiver and is used to transmit and receive signals (e.g. messages or packets) according to processing results of the processor 1100. In an embodiment, the communication unit 1120 transmits and receives the signals via at least one antenna 1122 shown in FIG. 11.

In an embodiment, the storage unit 1110 and the program code 1112 may be omitted and the processor 1100 may include a storage unit with stored program code.

The processor 1100 may implement any one of the steps in exemplified embodiments on the wireless terminal 110, e.g., by executing the program code 1112.

The communication unit 1120 may be a transceiver. The communication unit 1120 may as an alternative or in addition be combining a transmitting unit and a receiving unit configured to transmit and to receive, respectively, signals to and from a wireless network node (e.g. a base station).

Figure 12:
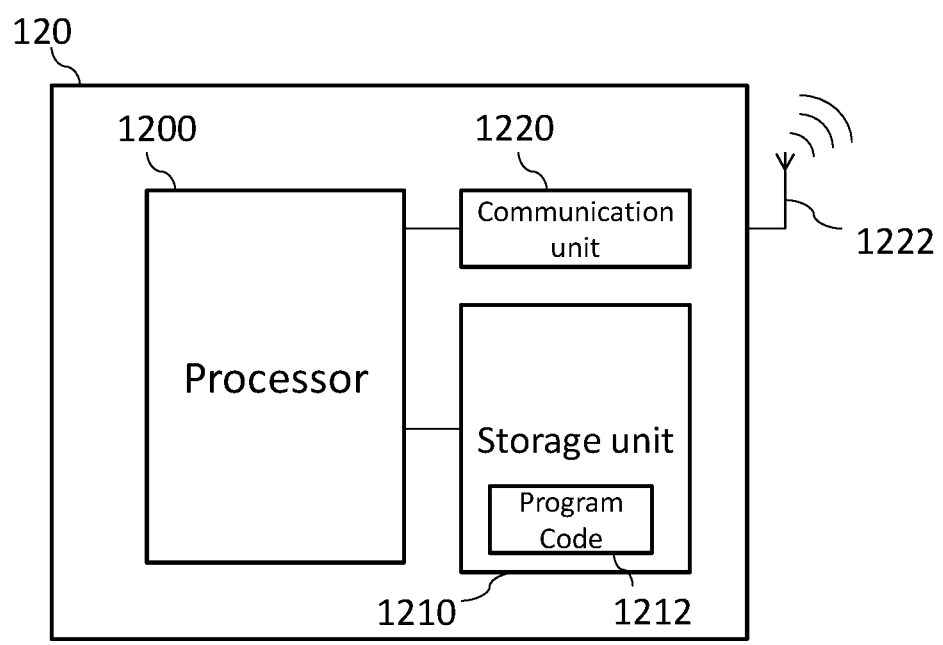
FIG. 12 shows an example of a schematic diagram of a wireless network node according to an embodiment of the present disclosure.

FIG. 12 relates to a schematic diagram of a wireless network node 120 according to an embodiment of the present disclosure. The wireless network node 120 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 120 may comprise (perform) at least one network function such as an access and mobility management function (AMF), a session management function (SMF), a user place function (UPF), a policy control function (PCF), an application function (AF), etc. The wireless network node 120 may include a processor 1200 such as a microprocessor or ASIC, a storage unit 1210 and a communication unit 1220. The storage unit 1210 may be any data storage device that stores a program code 1212, which is accessed and executed by the processor 1200. Examples of the storage unit 1210 include but are not limited to a SIM, ROM, flash memory, RAM, hard-disk, and optical data storage device. The communication unit 1220 may be a transceiver and is used to transmit and receive signals (e.g. messages or packets) according to processing results of the processor 1200. In an example, the communication unit 1220 transmits and receives the signals via at least one antenna 1222 shown in FIG. 12.

In an embodiment, the storage unit 1210 and the program code 1212 may be omitted. The processor 1200 may include a storage unit with stored program code.

The processor 1200 may implement any steps described in exemplified embodiments on the wireless network node 120, e.g., via executing the program code 1212.

The communication unit 1220 may be a transceiver. The communication unit 1220 may as an alternative or in addition be combining a transmitting unit and a receiving unit configured to transmit and to receive, respectively, signals to and from a wireless terminal (e.g. a user equipment).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a second wireless device, the wireless communication method comprising:
    transmitting, to a first wireless device, a response frame corresponding to a received frame from the first wireless device on a link within a transmission opportunity (TXOP); and
    receiving, from the first wireless device, a second frame in response to receiving a PHY-RXSTART indication primitive and switching to per-link spatial stream capabilities in response to not receiving a PHY-RXSTART.indication primitive during a specific period.

2. The wireless communication method of claim 1, wherein the response frame comprises at least one of an acknowledgement (ACK) or a block acknowledgement (BA) frame, and wherein the received frame is a downlink frame.

3. The wireless communication method of claim 1, wherein before the transmission of the response frame, the second wireless device receives a control frame on the link.

4. A second wireless device, comprising at least one processor configured for:
    transmitting, via a transceiver to a first wireless device, a response frame corresponding to a received frame from the first wireless device on a link within a transmission opportunity (TXOP); and
    receiving, via the transceiver from the first wireless device, a second frame in response to receiving a PHY-RXSTART.indication primitive and switching to per-link spatial stream capabilities in response to not receiving a PHY-RXSTART.indication primitive during a specific period.

5. The second wireless device of claim 4, wherein the response frame comprises at least one of an acknowledgement (ACK) or a block acknowledgement (BA) frame, and wherein the received frame is a downlink frame.

6. The second wireless device of claim 4, wherein before the transmission of the response frame, the second wireless device receives a control frame on the link.

7. A non-transitory computer-readable medium with code stored thereupon, the code, when executed by at least one processor, causes the at least one processor to implement a wireless communication method comprising:
   transmitting, to a first wireless device, a response frame corresponding to a received frame from the first wireless device on a link within a transmission opportunity (TXOP); and
   receiving, from the first wireless device, a second frame in response to receiving a PHY-RXSTART.indication primitive and switching to per-link spatial stream capabilities in response to not receiving a PHY-RXSTART.indication primitive during a specific period.

8. The non-transitory computer-readable medium of claim 7, wherein the response frame comprises at least one of an acknowledgement (ACK) or a block acknowledgement (BA) frame, and wherein the received frame is a downlink frame.

9. The non-transitory computer-readable medium of claim 7, wherein before the transmission of the response frame, the second wireless device receives a control frame on the link.

* * * * *